F. C. LYNDE.
CARBURETING APPARATUS.
APPLICATION FILED MAR. 28, 1908.
1,062,981.
Patented May 27, 1913.
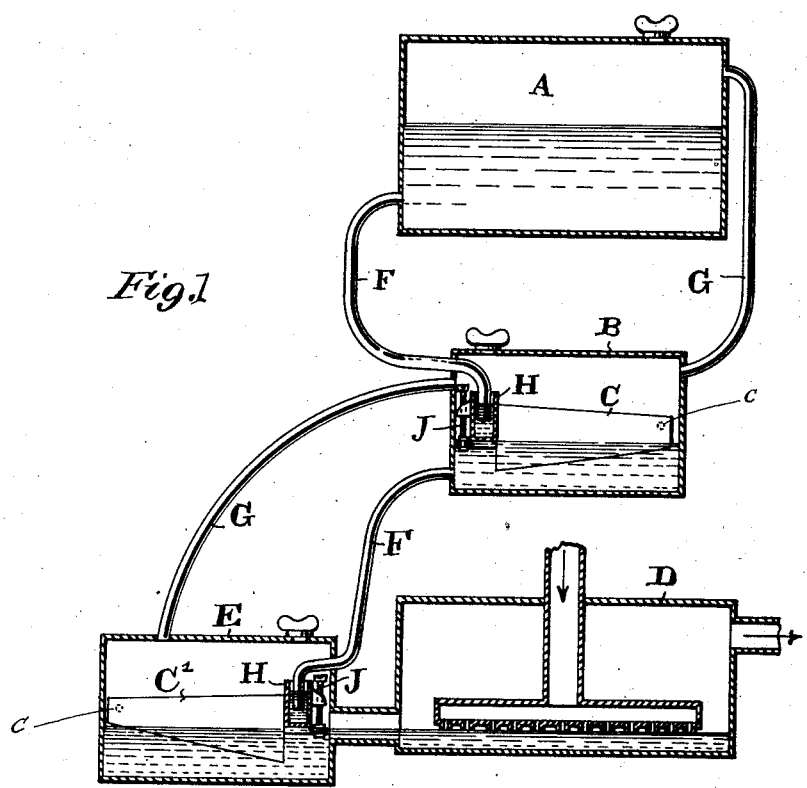
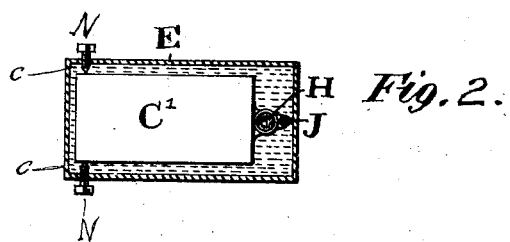

UNITED STATES PATENT OFFICE.

FREDERICK C. LYNDE, OF WITHINGTON, MANCHESTER, ENGLAND, ASSIGNOR OF ONE-HALF TO CLEMENT VINCENT HAWORTH, OF POULTON-LE-FYLDE, ENGLAND.

CARBURETING APPARATUS.

1,062,981. Specification of Letters Patent. Patented May 27, 1913.

Application filed March 28, 1908. Serial No. 423,823.

*To all whom it may concern:*

Be it known that I, FREDERICK CHARLES LYNDE, a subject of the King of Great Britain and Ireland, and a resident of Withington, Manchester, in the county of Lancaster, England, have invented new and useful Improvements in Carbureting Apparatus, of which the following is a specification.

This invention relates to improvements in float valves for carbureters and the like, wherein it is essential to insure a constant level of petrol to obtain a uniform feed to a carbureter.

The object of my invention is to provide a float valve which will be capable of accuracy of control and whose operation will be automatic without any danger of failure due to the presence of grit and dirt, as is true of the ordinary valve.

With this and other objects in view, my invention consists in the construction and combination of parts set forth in the specification and claim appended hereto.

In the drawings, Figure 1 shows a vertical sectional view of the carbureter and feed-tanks provided with float valves; and Fig. 2 is a horizontal sectional view of a float device.

For the purposes of illustration, the float-valve device is shown in connection with a carbureter and feed-tank, but the use of the float valve is in no wise limited to this particular arrangement and may be used wherever it is deemed necessary to obtain an automatic accurate control of supply of liquid fuel.

Referring to Fig. 1, an arrangement is shown which illustrates one adaptation of the float valve, wherein is a petrol main supply tank A of any desired capacity and construction, which is connected to a smaller tank B interposed at a lower level but higher than the carbureter D, and is supplied with liquid-fuel direct from A through the pipe F. From the tank B the liquid is supplied directly to a carbureter feed-tank E which is in free connection with the carbureter D of a usual construction by a second pipe F connecting the tank B with the feed-tank E. The pipes G shown are air-pipes for the purpose of connecting together the upper portions of the various tanks.

C and C' designate the float feed devices which are of similar construction and one only need be described. The device consists of a float C of any well known construction pivoted by set-screws N which engage with the sides of the float at one end thereof, so as to allow it to be free to move with the rise and fall of the liquid-fuel contained in the tank B. Attached at the free end of the float C is a cup H. This cup is movably mounted on the float by means of a screw J which is mounted on a projection on the float and coöperates with a lug having a threaded hole therein carried by the cup H. When it is desired to adjust the cup, it may be moved vertically with respect to the float by means of this screw. The end of the pipe F is bent so as to dip into the cup which is filled with mercury and thus affords a seal whereby nicety of control can be obtained and there is no danger of failure of the seal through the presence of grit or dirt, as would be the case in ordinary valves.

The operation of the device will now be described: Liquid flows from the tank A through the pipe F into the tank B until it has reached the required level, at which time the float and cup have risen so that the end of the pipe F dips into the mercury and closes the same when the weight of the column of mercury in the cup above the end of the pipe F is greater than that of the weight of the column of petrol in the pipe, thus cutting off the liquid supply. Liquid fuel leads through a second pipe F from the tank B to the tank E where a similar operation takes place. As the oil from the tank E feeds into the carbureter, the level of the liquid fuel within the same will fall and the mercury cup, together with the float, will descend until the end of the pipe is unsealed and more liquid may flow into the tank until the proper level is restored, and the supply is again cut off. With the customary arrangement of a main supply tank feeding directly to a carbureter float valve, the level of liquid in the carbureter varies according to the height of the liquid in the main supply tank owing to the float valve permitting the passage of a varying supply for a like movement of the valve under varying heads of pressure. This disadvantage is overcome by the arrangement just described, as any variation of level due to the variation of level and pressure in the main feed-tank thus takes place in the interposed tank B, and the carbureter float valve is only subjected to the slight variations of level and pressures which take place in such interposed tank. A practically constant level of liquid is thus maintained in the carbureter and a mixture of constant richness given off. In a like manner two or more interposed tanks may be employed in series between the main supply tank and the carbureter.

The float valve described is capable of many adaptations, and it is not the intention to limit it to the particular construction and adaptation shown but only by the scope of the claim appended hereto.

I claim—

In a device of the character described, a float hinged at one end thereof, a cup carried by said float at the free end thereof whereby said cup may be given an extended range of movement relative to that of the center of gravity of the float, and a mercury seal in said cup for controlling the inlet of liquid thereinto and means for adjusting the height of said cup with respect to said float.

In witness whereof I have set my hand hereunto in the presence of two subscribing witnesses.

FRED. C. LYNDE.

Witnesses:
WILLIAM GEO. HEYS,
J. O'CONNELL.

---

Copies of this patent may be obtained for five cents each, by addressing the "Commissioner of Patents, Washington, D. C."